April 15, 1969  C. D. KIRKSEY  3,438,141
PSYCHOLOGY TEST METHOD AND DEVICE
Filed Sept. 22, 1967
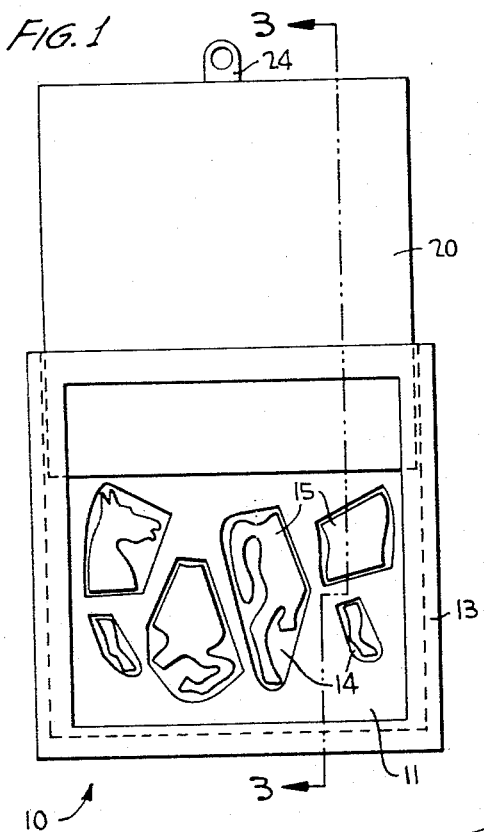
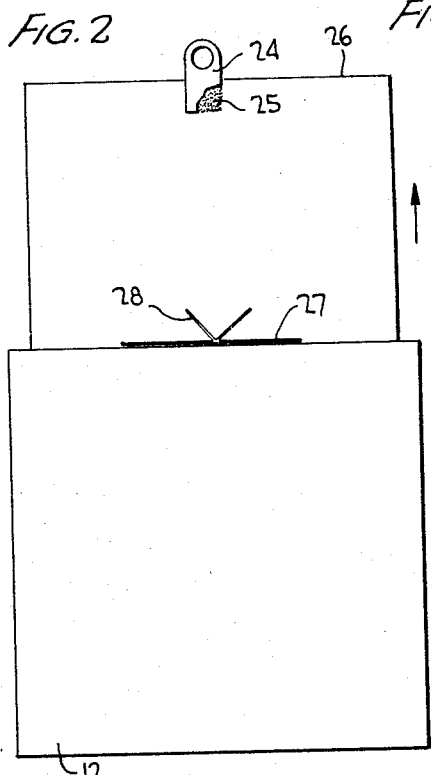
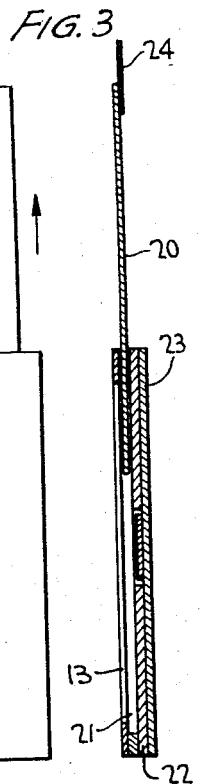
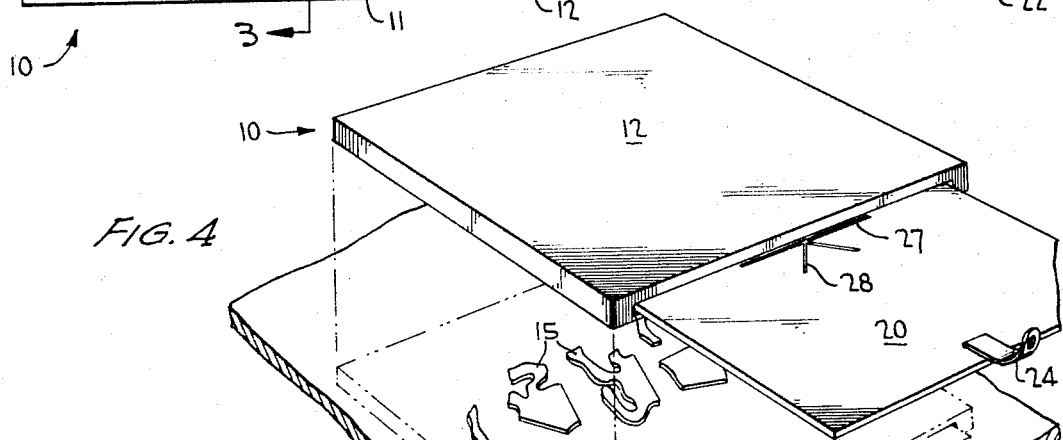
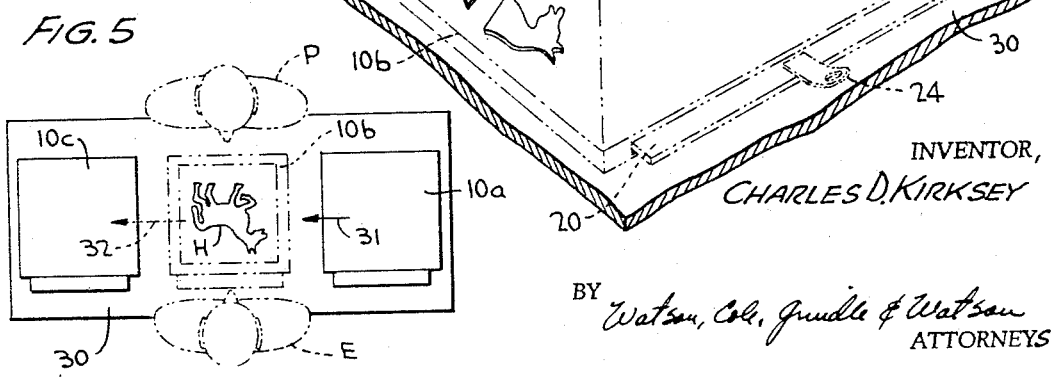
INVENTOR,
CHARLES D. KIRKSEY
BY Watson, Cole, Grindle & Watson
ATTORNEYS United States Patent Office 3,438,141
Patented Apr. 15, 1969

3,438,141
PSYCHOLOGY TEST METHOD AND DEVICE
Charles D. Kirksey, 1316 Davis St.,
Clovis, N. Mex. 88101
Filed Sept. 22, 1967, Ser. No. 669,744
Int. Cl. G09b 19/00; A63f 9/10, 9/12
U.S. Cl. 35—22          9 Claims

ABSTRACT OF THE DISCLOSURE

An arrangement for conducting a test utilizing a puzzle wherein the pieces are positioned on a smooth working surface in a predetermined random position and then fitted together by moving the same from the random position into the final assembled position. To insure that the pieces are released onto the working surface in the predetermined position each time the test is given, the pieces are retained face down in corresponding cut-outs on a board and then released in juxtaposition to the surface after flipping the board over. The function of retaining the pieces in the cut-outs is performed by a sliding cover and the board is held in firm engagement with the working surface when releasing the pieces.

The present invention relates to psychology test methods and apparatus and, more particularly, to such a test which is performed with the use of a puzzle.

One of the best known methods of determining the basic intelligence of a person has been found to be through the use of tests that include puzzles representing simple objects or geometric shapes, which are to be worked by the person being tested within a predetermined amount of time. These test puzzles are usually administered by psychologists who can draw definite conclusion, not only as to the intelligence of the person, but also as to certain personal traits, such as neatness, composure, dexterity, etc. by observing the subject in action as he proceeds to put the pieces together to form the object. Specifically, one type of test in which these puzzle sub-tests have been used is known in the art as the Wechsler Test, which has proved to be highly accurate in determining the intelligence of both children and adults.

Prior to the present invention, the psychologist or examiner conducting the test was required to manually place the various pieces of the puzzle in random fashion on the working surface in front of the individual to be tested. This procedure has left much to be desired in that it is virtually impossible for the examiner to position the pieces in exactly the same random position on each test. This means that the results of the tests, which are largely based on comparisons with test results on other subjects, are not completely accurate in that one positioning of the pieces might be more difficult than another positioning of the pieces, and thus require a longer time period for working the puzzle. Furthermore, this prior art test procedure has proved to be cumbersome and to require an excessive amount of time to administer, especially if several puzzle sub-tests are being used in succession, since to set up each puzzle, the examiner must first position a shield between the subject and the puzzle pieces and then proceed to manually arrange the pieces one at a time in the required position by reference to a master chart. As will be realized, this manipulation of a shield, loose puzzle pieces and a chart by the examiner tends to be highly distracting to the test subject so that his concentration on the test is interrupted, his confidence in the test is destroyed or weakened to the point that his efforts on the remainder of the test are reduced, and thus the results of the sub-tests are further adversely affected.

Accordingly, it is one object of the present invention to provide an improved method and device for conducting a psychology test of the type described whereby the test can be carried out in a minimum amount of time.

It is another object of the present invention to provide a test arrangement wherein the puzzle pieces are arranged in exactly the same predetermined position for each test so that the results of the test are highly accurate.

It is another object of the present invention to provide a test arrangement which can be easily handled by the examiner whereby the subject being tested is not distracted in any manner so as to further enhance the accuracy of the tests.

To briefly describe the method and device of the present invention, the examiner first places the pieces of the puzzle face down in cut-outs on a board so that the pieces are positioned in a predetermined random fashion which has previously been worked out. The pieces are next secured in the cut-outs so that the board may be flipped over on its face and placed on the working surface in front of the subject being tested. With the board in the desired position, it is securely held by the examiner who then releases the pieces from the cut-outs of the board so that they appear face up on the working surface in readiness for assembling. By causing actual engagement between the board and the working surface, the pieces are assured of being released while the board is steady so that they are properly positioned in accordance with the predetermined position of the cut-outs. Further, the pieces are released while being in substantial juxtaposition to the surface but advantageously at the same time the cover is maintained in spaced relationship to the working surface so that it may be withdrawn easily. In accordance with an additional step which is contemplated to be within the purview of the present invention, the board with the sliding cover closed can be placed over the puzzle which has just been completed so that a raised peripheral border laterally engages the pieces in the assembled condition whereby they may be moved with the board by simply sliding laterally across the surface in front of the subject so as to clear the area for the next sub-test.

The novel device for use with the above method includes a board having recesses or cut-outs formed therein to receive the puzzle pieces in a face down and unassembled or random fashion. A cover is slidably mounted in the board so as to be positionable across the backs of the pieces to retain the same in the board while the board is flipped over prior to releasing the pieces. The board has a raised border around its face so that it can be held in firm relationship with the working surface while the cover is being withdrawn. To denote the outer limit of the withdrawing movement when all the pieces are released, a V-shaped marking opens toward the free edge of the cover so as to signal by a decreasing gap the approach of said limit point. Preferably, the cut-outs are formed so as to conform only to the general outline of the pieces so that the pieces will appear in the predetermined relationship while at the same time being easy to insert and free to fall from the board without restriction.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is a top plan view of a board constructed in accordance with the teachings of the present invention;

FIGURE 2 is a plan view of the back of said board shown in FIGURE 1;

FIGURE 3 is a cross-sectional view taken along line 3—3 of FIGURE 1;

FIGURE 4 is a perspective view showing the board in a working environment; and

FIGURE 5 is a schematic plan view of the lateral movement of the boards in front of the subject in one method of conducting the test in accordance with the present invention.

To more fully describe the preferred embodiment of the device for use in the present invention, with reference to FIGURES 1–3, one sub-test is shown and comprises a board, generally designated by the reference numeral 10 and having a front face 11 (FIGURE 1) and a back face 12 (FIGURE 2). The front face 11 is picture framed by a raised peripheral border 13 and within this border there is provided a plurality of cut-outs or openings 14. Within these cut-outs 14 are positioned puzzle pieces 15 which, it will be recognized, comprise in random arrangement the body of a horse. It is significant that the cut-outs 14 are shaped to only generally conform to the outline of the pieces 15, but which however are sufficiently close to insure that the pieces 15 can go only in the intended cut-out 14 and in the proper face down and angular position. This feature is of importance to insure that the pieces can be readily positioned on the board 10 and so that, as will be seen later, the pieces are free to fall from the board 10 when released.

As will be realized by those skilled in this art, the pieces 15 are capable of being exposed and thus released by gravity when in the face down position by withdrawing the cover 20. In particular, the cover 20 is positioned in a channel 21, as best illustrated in FIGURE 3, between a center layer 22 and the border 13. The cut-outs 14 on the face 11 are formed in this particular embodiment in the center layer 22 with the back plate 23 completing the laminate structure and serving to retain the pieces 15 in position from the back of the board 10.

The cover 20 has a tab 24 fastened to its free edge 25 by a suitable layer of cement 26 (FIGURE 2). Thus, to withdraw the cover 20, it is grasped so as to move the cover 20 in the direction of the arrow shown in FIGURE 2, and is continued to be withdrawn until cross line 27 is reached, which indicates the position of the cover 20 in FIGURE 1 wherein all of the pieces 15 are exposed for release. In order to signal the user when the line 27 is approached, a V-shaped indicator 28 is formed on the cover 20 and connected at its apex to the cross line 27 so that the opening extends toward the free edge 25. As the V-shaped indicator 28 is traversed during the withdrawing movement, the gap between the two lines will become less so that the apex and thus the cross line 27 can be anticipated. When the cover 20 is in its outer limit, it is still securely held as a part of the board 10 so that it can be readily returned to the closed position when desired.

To explain the overall operation of the device, reference is now made to FIGURES 4 and 5 of the drawings in which the board 10 is shown in a working environment including a working surface 30, which may be the top of a suitable table. The most usual example of the manner in which the board 10 is to be used is shown in FIGURE 5, wherein the pupil or person to be tested, denoted by the reference indicia P, is positioned on one side of the working surface 30 and the examiner or psychologist E giving the test is positioned on the opposite side of the table. Normally, the board 10 waiting for submission to the person P is positioned face down to the right of the examiner E, and has been designated by the reference numeral 10a in FIGURE 5. Thus, when a new board 10 is to be presented at the work station, the board 10a is moved into the position indicated by the board outline 10b, as denoted by the solid arrow 31 in this figure. When it has been positioned, the examiner E firmly holds the board 10 against the working surface 30 and slowly pulls the cover 20 to release the pieces 15. Since the border 13 is the only part of the board 10 that engages the working surface 30, the cover can be removed without resistance while at the same time the board 10 is assured of being held in a secure position.

Using the indicator 28, the cover 20 is pulled out to the limit denoted by the cross line 27, whereupon the pieces are released and fall the short distance to a face up position on the working surface 30. After the pieces are released, the board 10 is raised substantially straight up, as illustrated in FIGURE 4, so that the pieces 15 are now exposed to the person P on the working surface 30. It should be noted that up to this point, the pieces 15 have been shielded from the view of the person P by the back face 12 so that the need for a separate shield for this purpose which has previously been required is eliminated.

At this point, the timing of the sub-test by the examiner E is begun and the person P being tested proceeds until the pieces are together as shown by the horse figure H in FIGURE 5. After the test has been completed, the time is recorded which it will be realized is accurate, since there has been no possible chance for the person P to see the pieces 15 prior to the initiation of the timing. The examiner E then simply places the board into the position 10b with the cover 20 closed so that the horse H is positioned within the border 13 whereupon the board 10 is moved from the position 10b, as noted by the dashed line arrow 32, to the left of the examiner E into the position 10c. Of course, the pieces 15, although not necessarily remaining in worked position, are thus expeditiously moved from the work station so as to clear the same to make room for the movement of the next board 10 from the position 10a, as indicated by the arrow 31. Thus, from the above, it should be realized that the method and device of the present invention lends itself to the giving of a series of this type of sub-tests in an efficient manner. There are no loose pieces for the examiner to be bothered with and a person being tested is not in any way distracted by periods of inaction. Also, the few necessary movements of the examiner E are smooth and can be carried out almost without notice so as also not to be distracting in any way. Additionally, the device is of very simple construction and inexpensive to build so that it lends itself to use on a wide scale basis in the psychology art.

In this disclosure, there is shown and described only the preferred embodiment of the invention, but, as aforementioned, it is to be understood that the invention is capable of various changes or modifications within the scope of the inventive concept as expressed by the accompanying claims.

I claim:

1. A method for conducting a psychology test with a puzzle to be worked by a subject on a working surface comprising the steps of placing the pieces of the puzzle face down in corresponding cut-outs formed in random fashion on the face of a board, flipping the board over on its face while retaining the pieces within the cut-outs, releasing said pieces from the board so as to cause the same to appear face up on said working surface, whereby the same are positioned in predetermined random fashion for use by the subject in working the puzzle.

2. The method of claim 1 wherein the step of retaining said pieces in said cut-outs is performed by covering said pieces with a cover held in operative sliding engagement with said board and the step of releasing said pieces is performed by sliding said cover relative to said board.

3. The method of claim 2 wherein is provided the additional step of holding a raised border portion of the board in firm engagement with the working surface while maintaining the cover spaced slightly above the same prior to releasing the pieces whereby said pieces are controllably released while in substantial face-to-face relationship with said surface.

4. The method of claim 3 wherein there is included the additional steps of placing the board over the completed puzzle while the sliding cover is closed so as to hold the pieces captive by said border portion within the space between said cover and said working surface, and moving said board laterally along said working surface to rapidly clear the same in readiness for the next test.

5. The method of claim 2 wherein the sliding of said cover is terminated while still in engagement with said board.

6. A device for conducting a psychology test with a puzzle to be worked by a subject on a working surface comprising a board, a plurality of puzzle pieces to be assembled during said test, a plurality of corresponding cut-outs formed on the face of said board for receiving said pieces face down, said cut-outs being arranged in a random fashion, and means for selectively retaining said pieces within said cut-outs, whereby when said board is flipped over on its face and said retaining means is released said pieces are positioned face up on said working surface in a predetermined random fashion for use by the subject in working the puzzle.

7. The combination of claim 6 wherein said board includes a raised border around said face and said retaining means includes a sliding cover mounted by said raised border, whereby said board may be held in firm engagement with said working surface to allow controlled release of said pieces in substantial face-to-face relationship with said surface.

8. The combination of claim 7 wherein the back of said sliding cover includes indicia to indicate the point of sliding travel where release of said pieces is complete, said indicia including a V-shaped marking opening toward the free edge of said cover so as to signal by a decreasing gap the approach of said point.

9. The combination of claim 6 wherein said cut-outs are shaped to conform only to the general outline of said pieces to facilitate placement and removal of said pieces.

References Cited

UNITED STATES PATENTS

| | | | |
|---|---|---|---|
| 2,731,766 | 1/1956 | Rubin | 273—157 X |
| 2,954,616 | 10/1960 | Mogard | 273—157 X |

EUGENE R. CAPOZIO, *Primary Examiner.*

U.S. Cl. X.R.
35—73; 273—157